United States Patent [19]
Tarbox et al.

[11] 3,779,566
[45] Dec. 18, 1973

[54] WORKPIECE STOP FOR A COLLET
[75] Inventors: Willis Tarbox, Big Flats; Vincent Dolan; Ralston L. Harman, both of Elmira, all of N.Y.
[73] Assignee: Hardinge Brothers, Inc., Elmira, N.J.
[22] Filed: Dec. 3, 1971
[21] Appl. No.: 204,612

[52] U.S. Cl.................. 279/1 S, 279/51, 82/34 C
[51] Int. Cl............................................ B23b 31/20
[58] Field of Search .................... 279/1 A, 1 S, 51, 279/52, 53, 1 SJ; 82/34 C

[56] References Cited
UNITED STATES PATENTS
2,922,656  1/1960  Belloli............................ 279/1 S FOREIGN PATENTS OR APPLICATIONS
540,663  10/1941  Great Britain..................... 279/51

Primary Examiner—Francis S. Husar
Attorney—B. Edward Shlesinger, Jr. et al.

[57] ABSTRACT

A work gripping device for a machine tool spindle comprising a collet for mounting on the spindle, a stop insert member in the collet and having front and rear portions, a stop member, means for mounting the stop member in the stop insert member, the front portion of the stop insert member including work gripping means, and the front portion further including a spindle engaging abutment member extending radially beyond the collet so that the abutment member may contact the spindle when the collet is closed.

29 Claims, 8 Drawing Figures

PATENTED DEC 18 1973 3,779,566

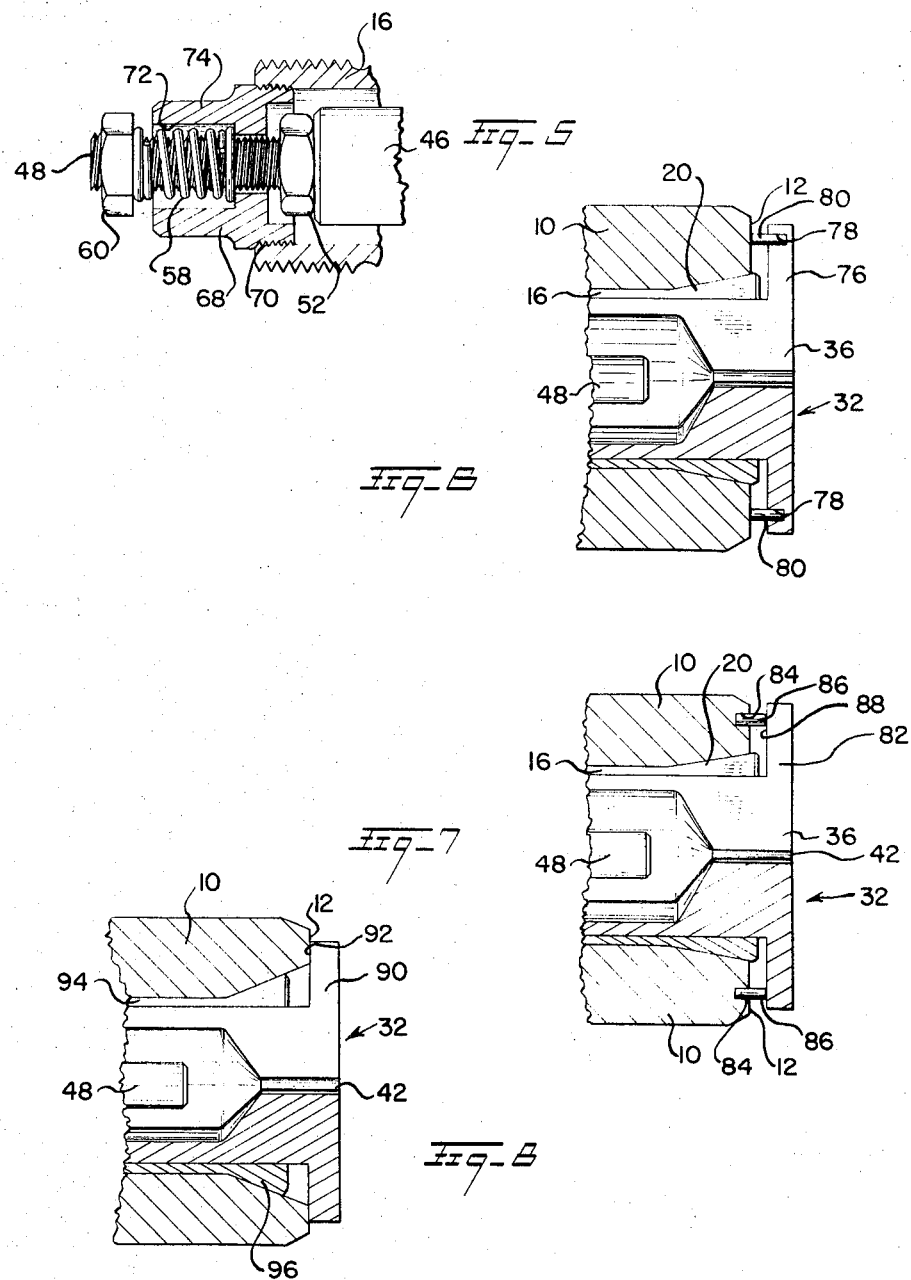

WORKPIECE STOP FOR A COLLET

This invention relates to a workpiece stop for use with a collet on a machine tool, and more particularly to a workpiece stop wherein extreme precision may be attained on the workpiece.

BACKGROUND AND OBJECTS

Many types of workpiece stops have been devised for use with collets. These devices generally consist of an abutment member or stop member positioned within the collet and which are contacted by the workpiece when it is inserted into the collet. The stop member serves to provide for ready repeatability when cutting off a workpiece to a given length. Typical of prior art patents are U.S. Pat. Nos. 2,469,160 to Evans, and 2,871,023 to McCormick. These stops are mounted inside of the collet and secured with respect to the spindle through the wall of the collet.

Other types of devices have been proposed wherein the stop member is secured to the collet and moves therewith. A major disadvantage of this type of workpiece stop member is that it moves with the collet and since the collet moves longitudinally, variations in the length of the workpiece machined will result. This is particularly true wherein the diameter dimension of the workpiece is not critical as would be the length dimension, because variations in the diameter result in different lengths of travel of the collet with respect to the spindle when the collet is closed to a gripping position. If the stop member is rigidly mounted with respect to the collet, when the collet draws back farther into the spindle because of a smaller diameter part, the stop also moves back with the collet producing a longer part, inasmuch as the facing tool is in a fixed position relative to the spindle.

U.S. Pat. No. 3,041,078 to Lawall et al. attempts to overcome this disadvantage by providing a stop which contacts an abutment on the spindle to fix the position of the stop. Additionally, U.S. Pat. No. 3,510,141 provides for overcoming the same disadvantage but in a different manner.

The present invention provides still another method for overcoming this disadvantage in prior art workpiece stops and may be utilized with existing collets and spindles. By this invention, an insert is provided within the collet for holding the stop member, and also for abutting the spindle so as to limit the inward travel of the stop member while permitting additional movement of the collet for tightening purposes. Additionally, the work gripping surface is provided on the insert member.

Therefore, it is a primary object of this invention to overcome the disadvantages of prior art workpiece stops.

Still another object of this invention is to provide a workpiece stop for collets which may be readily adjusted.

Yet another object of this invention is to provide a workpiece stop wherein extremely precision machining may be carried out.

Still a further object of this invention is to provide a workpiece stop wherein the work is gripped by the stop holding member which in turn is tightened by the collet.

Yet another object of this invention is to provide a workpiece stop insert for a collet wherein the concentricity of the workpiece gripping jaws is maintained by machining the jaws after the collet is assembled.

Still another object of this invention is to provide a workpiece stop insert for a collet which maintains its accuracy of position regardless of wear on the cam surfaces of the collet or diametrical variations in successive workpieces.

Yet a further object of this invention is to provide a stop holding insert for a collet which is urged into the collet by a spring mechanism.

Still a further object of this invention is to provide a stop holding insert for a collet which is restrained from rotating with respect to the collet while permitted to shift axially with respect to the collet.

These and other objects and advantages of this invention will become apparent when considered in light of the following description and claims when taken together with the drawings in which:

FIG. 5 is a fragmentary sectional view showing an alternate arrangement of one of the parts of FIG. 1;

FIG. 6 is a fragmentary sectional view similar to FIG. 1 showing an alternate embodiment of this invention;

FIG. 7 is a fragmentary sectional view similar to FIG. 1 showing another alternate embodiment of this invention; and FIG. 8 is a fragmentary sectional view similar to FIGS. 6 and 7 showing still another alternate embodiment of this invention.

DESCRIPTION OF THE PREFERRED EMBODIMENT OF FIGS. 1 - 4

Figure 1:
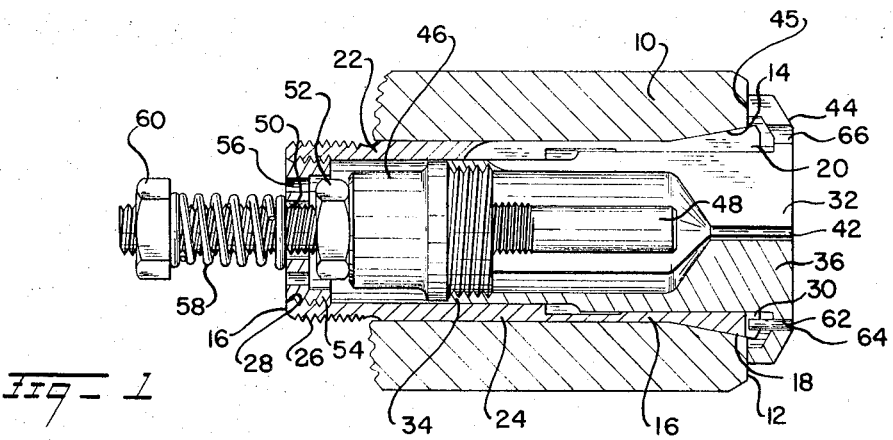
FIG. 1 is a fragmentary cross sectional view showing the preferred embodiment of this invention.

Referring now to FIG. 1, a spindle 10 which is mounted on a lathe (not shown) in the usual manner is seen to have a front surface 12 and a cam surface 14. The interior of spindle 10 is generally tubular so as to receive a collet 16 in the usual manner. Collet 16 includes a cam surface 18 which cooperates with cam surface 14 of the spindle 10 in the usual manner. When the collet 16 is drawn into the spindle 10, the cam surfaces 14 and 18 cooperate to force the jaws 20 of the collet radially inward. Collet 16 is of typical construction and includes a generally tubular body portion 22 having a plurality of fingers 24 extending forwardly therefrom. The body 22 of collet 16 is externally threaded as at 26 for attachment to the draw tube (not shown) of the machine tool. Additionally, the body 22 is internally threaded as at 28.

The front surface of one of the jaws 20 is provided with a notch 30 for a purpose to be hereinafter described.

The stop supporting insert member 32 is seen to include a tubular body portion 34 having a plurality of resilient fingers or jaws 36 extending therefrom. Between each of the jaws is a longitudinally extending radial slot 38. The body portion 34 of the insert 32 is internally threaded as at 40.

Figure 2:
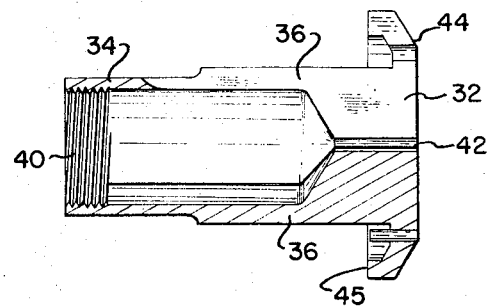
FIG. 2 is a longitudinal sectional view showing the stop holding insert of this invention.
Figure 3:
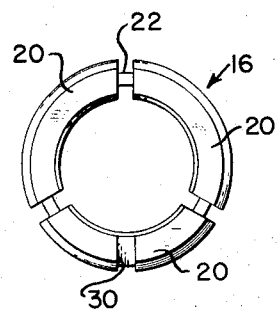
FIG. 3 is an end elevation of the collet shown in FIG. 1 with the insert removed.
Figure 4:
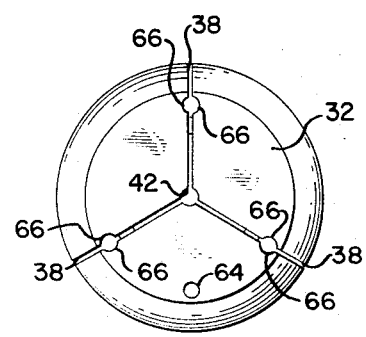
FIG. 4 is an end elevational view of the assembly shown in FIG. 1.

The right end of the jaws 36 as seen in FIG. 2 are provided with work gripping surfaces 42.

The jaws 36 are also provided with a radially extending flange portion 44 which is of a diameter so as to extend beyond the fingers 24 of the collet 16. On the flange 44 is provided an abutment surface 45 which is arranged so that it may contact the front surface 12 of the spindle 10.

Threaded into the inner end of insert 32 is an adaptor member 46, and includes an internally threaded bore (not shown) for receiving a stop member 48 which is externally threaded as at 50. The longitudinal position of the stop member 48 with respect to the adaptor member 46 may be adjusted by threading the stop member 48 into or out of the adapter 46. When the desired position is attained, it is locked by means of jamb nut 52.

Positioned around the stop member 48 and engaging the internal threads 28 of the collet 16 is a spring retainer cap 54. Cap 54 is provided with a pair of holes 56 for engagement by a suitable spanner wrench (not shown) for tightening the cap 54 into the collet 16.

A coil spring 58 is positioned around the threaded stop member 48 so as to abut the retainer cap 54 and is preloaded by means of a suitable nut 60. The spring 58 serves to pull the insert member 32 into the collet 16 when the collet 16 is released from a work gripping position.

One of the jaws 36 of the insert 32 is provided with a bore 62 for receiving a pin or key 64. The pin 64 is positioned in such a manner that it will engage the notch 30 in the collet jaw 20. In this manner, the insert 32 and the collet 16 will be restrained from rotating with respect to each other and will be aligned in the same position each time the insert 32 is assembled in the collet 16. This insures the accuracy of the concentricity of the work gripping surfaces 42.

When the collet 16 and insert 32 are assembled and positioned in the spindle 10 as previously described, the collet 16 is ready to be prepared for use. In prior art devices wherein additional jaws or the like have been utilized in a collet, a problem on the concentricity of the work gripping surface has arisen. This is overcome in the present invention in the following manner. A plurality of recesses 66 are formed in the jaws 36 of the insert 32 adjacent the slots 38. Suitable pins (not shown) are temporarily inserted into the recesses 66 and the collet 16 is drawn into the spindle 10. Preferably, the recesses 66 are positioned radially outside of the tubular body portion 34 to permit wide latitude in boring work gripping surface 42. The collet jaws 20 close down the jaws 36 of the insert 32 to lock the jaws 36 against the pins (not shown). Next, a suitable boring tool (not shown) is used to enlarge the work gripping surfaces 42 to the required diameter for a given workpiece. Since the spindle 10, collet 16, and insert 32 are rotating when the boring is done, the concentricity of the work gripping surfaces 42 is insured, and is maintained by means of the pin 64 cooperating with the notch 30.

When the collet is used a workpiece (not shown) is inserted into the insert 32 until it abuts the stop member 48. Next, the draw tube pulls back on the collet 16 which pulls with it the insert 32. When the surface 45 contacts the front surface 12 of spindle 10, the travel of the stop 48 and the workpiece is arrested, while the collet 16 may continue to be drawn rearwardly against the bias of spring 58 until sufficient work gripping pressure is exerted against the workpiece by the surfaces 42.

DESCRIPTION OF FIG. 5

FIG. 5 illustrates an alternative construction of the spring retainer cap. The collet 16, stop member 48, adaptor member 46, jamb nut 52, spring 58, and nut 60 are all the same as in FIG. 1. In this embodiment, a spring retainer cap 68 is provided and is seen to include a threaded portion 70. Additionally, a retainer cap 68 is provided with a socket 72 which surrounds the spring 68. The exterior surface 74 may be provided with suitable flats (not shown) or may be of a hexagonal configuration so as to be engageable by a suitable wrench (not shown) for tightening the retainer cap 68 into the collet 16.

DESCRIPTION OF FIG. 6

In FIG. 6, an alternate embodiment of this invention is shown wherein the insert member 32 having jaws 36 is provided with a disc-like flange portion 76. Flange portion 76 is provided with a plurality of bores 78 which receive pins 80. By this construction, pins 80 serve to contact the front surface 12 of spindle 10 when the collet 16 is drawn into the spindle 10. This construction replaces the surface 45 shown in FIG. 1.

DESCRIPTION OF FIG. 7

In FIG. 7, an alternate embodiment which is similar to the embodiment of FIG. 6 is shown. The insert 32 is provided with a disc-like flange 82 similar to flange 76 of FIG. 6. The front surface 12 of spindle 10 is provided with a plurality of bores 84 which receive pins 86. In this manner, when the collet 16 and the insert 32 are drawn inwardly to grip the workpiece at the surfaces 42, pins 86 contact the surface 88 of the flange 82. This limits the travel of the stop member 48 in a positive manner while permitting additional movement of the collet 16 to close the jaws 20.

It is obvious that the pins 86 in FIG. 7 or the pins 78 in FIG. 6 could be replaced by any suitable projection such as an upstanding rib which is continuous around the front surface 12 of the spindle 10. Of course it is necessary, regardless of what type of projection is utilized in the construction of FIGS. 6 or 7 that the projection extend sufficiently that the travel of the insert 32 will be arrested before the collet 16 is completely closed, or simultaneously with complete closure of the collet jaws 20.

DESCRIPTION OF FIG. 8

In FIG. 8, the insert 32 is seen to include a disc-like flange 90 similar to that of FIG. 7. The flange includes an abutment surface 92. The collet 94 used in the embodiment of FIG. 8 is provided with a shorter head portion 96 than is used in the previous embodiments. Its length is such that when the collet is closed, the head portion 96 will be completely within the end of the spindle 10. In this manner, the abutment surface 92 of the flange 90 will contact the surface 12 of the spindle 10 to arrest movement of the insert 32 and the stop member 48. However, the collet 94 will be permitted to continue its movement rearwardly into the spindle to a point at which the workpiece (not shown) is firmly gripped by the work engaging surfaces 42.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A work gripping device for a machine tool spindle comprising:
    a. a collet for mounting on said spindle,
    b. a stop insert member in said collet and having front and rear portions,
    c. a stop member,
    d. means for mounting said stop member in said stop insert member,
    e. said front portion of said stop insert member including work gripping means, and
    f. said front portion further including a spindle engaging abutment member extending radially beyond said collet so that said abutment member may contact said spindle when said collet is closed.
2. A work gripping device as in claim 1 and including:
    a. means for preventing relative rotation of said collet and said stop insert member.
3. A work gripping device as in claim 2 and wherein:
    a. said preventing means includes means for aligning said collet and said stop insert member in a predetermined position.
4. A work gripping device as in claim 3 and wherein:
    a. said mounting means includes stop member adjusting means.
5. A work gripping device as in claim 4 and wherein:
    a. said mounting means includes spring means.
6. A work gripping device as in claim 5 and wherein:
    a. said preventing means includes cooperating key means on said collet and said stop insert member.
7. A work gripping device as in claim 6 and wherein:
    a. said spring means biases said stop insert member into said collet.
8. A work gripping device as in claim 1 and wherein:
    a. said stop insert member comprises a tubular body member having a plurality of longitudinal slots extending from one end of said tubular body member toward the other end of said tubular body member and terminating short thereof for dividing said tubular body member into a tubular section having a plurality of fingers extending therefrom.
9. A work gripping device as in claim 8 and including:
    a. each of said fingers having a recess adjacent each of said slots extending rearwardly parallel to the longitudinal axis of said tubular body member from the front of said fingers.
10. A work gripping device as in claim 9 and wherein:
    a. said mounting means comprises a coupling member threadedly engaging said tubular section.
11. A work gripping device as in claim 10 and including:
    a. means for positioning said stop insert member in said collet.
12. A work gripping device as in claim 11 and wherein:
    a. said positioning means includes a collar member threadedly engaging said collet, and
    b. said stop member includes a rear portion extending through said collar member.
13. A work gripping device as in claim 12 and wherein:
    a. said rear portion of said stop member is threaded,
    b. a stop nut on said threaded rear portion of said stop member, and
    c. spring means on said stop member between said stop nut and said collar member for biasing said stop member into said collet.
14. A work gripping device as in claim 1 and wherein:
    a. said spindle engaging abutment member comprises a flange member.
15. A work gripping device as in claim 14 and including:
    a. projection means extending from said flange member toward said spindle for abutting contact therewith when said collet is closed.
16. A work gripping device as in claim 15 and wherein:
    a. said projecting means includes a plurality of pins.
17. A work gripping device as in claim 15 and wherein:
    a. said projecting means comprises an annular rib.
18. A work gripping device as in claim 14 and including:
    a. a spindle, and
    b. projecting means extending from said spindle toward said flange member for abutting contact therewith when said collet is closed.
19. A work gripping device as in claim 18 and wherein:
    a. said projecting means includes a plurality of pins.
20. A work gripping device as in claim 18 and wherein:
    a. said projecting means comprises an annular rib.
21. A work gripping device as in claim 13 and wherein:
    a. said collar member includes a socket for receiving said spring means.
22. An adaptor for insertion into a collet for supporting a workpiece stop within said collet comprising:
    a. a cylinderical body having a longitudinal axis,
    b. a head portion at the outer end of said body having a front face,
    c. a plurality of radial slots extending parallel to said longitudinal axis for dividing said head portion into a plurality of segments each having substantially parallel inner and outer surfaces,
    d. said inner surface including a work gripping portion,
    e. a flange extending outwardly from said outer surface adjacent said front face, and
    f. abutment means on said flange, and
    thread means for supporting a stop member in said body.
23. An adaptor as in claim 22 and wherein:
    a. each of said segments includes a recess adjacent each of said slots extending rearwardly parallel to said longitudinal axis from said front face of said collet head.
24. An adaptor as in claim 23 and wherein:
    a. said abutment means comprises means projecting rearwardly from said flange adjacent the periphery of said flange.
25. An adaptor as in claim 24 and wherein:
    a. said projecting means comprises a plurality of radially spaced pins.
26. An adaptor as in claim 24 and wherein:

a. said projecting means comprises an annular rib.

27. An adaptor as in claim 23 and wherein:

a. said flange is substantially perpendicular to said longitudinal axis.

28. An adaptor as in claim 22 and including:

a. positioning means in one of said segments.

29. An adaptor as in claim 28 and wherein:

a. said positioning means comprises a passageway formed in said flange, and b. key means in said passageway projecting rearwardly of said flange.

* * * * *